United States Patent
Ochi

(10) Patent No.: US 11,000,990 B2
(45) Date of Patent: May 11, 2021

(54) FORMING APPARATUS AND FORMING METHOD

(71) Applicant: MIMAKI ENGINEERING CO., LTD., Nagano (JP)

(72) Inventor: Kazuhiro Ochi, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 333 days.

(21) Appl. No.: 15/684,169

(22) Filed: Aug. 23, 2017

(65) Prior Publication Data
US 2018/0056581 A1 Mar. 1, 2018

(30) Foreign Application Priority Data

Aug. 26, 2016 (JP) .............................. JP2016-165398

(51) Int. Cl.
| | |
|---|---|
| *B29C 64/112* | (2017.01) |
| *B33Y 50/02* | (2015.01) |
| *B29C 64/209* | (2017.01) |
| *B29C 64/393* | (2017.01) |
| *B33Y 10/00* | (2015.01) |
| *B33Y 30/00* | (2015.01) |

(52) U.S. Cl.
CPC .......... *B29C 64/112* (2017.08); *B29C 64/209* (2017.08); *B29C 64/393* (2017.08); *B33Y 10/00* (2014.12); *B33Y 30/00* (2014.12); *B33Y 50/02* (2014.12); *B29K 2995/0021* (2013.01)

(58) Field of Classification Search
CPC .... B29C 64/209; B29C 64/112; B29C 64/295
See application file for complete search history.

(56) References Cited

U.S. PATENT DOCUMENTS

| | | | |
|---|---|---|---|
| 2005/0015173 A1 | 1/2005 | Ohmori et al. | |
| 2010/0191360 A1* | 7/2010 | Napadensky | ........... G06T 17/00 700/98 |

(Continued)

FOREIGN PATENT DOCUMENTS

| | | |
|---|---|---|
| JP | 2015123685 A | 7/2015 |
| JP | 2016-16553 A | 2/2016 |

(Continued)

OTHER PUBLICATIONS

Japanese Office Action (JPOA) dated Jun. 9, 2020 issued in the corresponding Japanese Patent Application No. 2016-165398 and its English translation.

(Continued)

*Primary Examiner* — Jacob T Minskey
*Assistant Examiner* — Jennifer A Kessie
(74) *Attorney, Agent, or Firm* — Rankin, Hill & Clark LLP

(57) ABSTRACT

A forming apparatus configured to form a three-dimensional object includes a head configured to extrude build materials and a controller configured to control extrusion of the materials by the head. The three-dimensional object includes a colored region that is colored using a coloring material among the materials. The head includes a head for coloring that is an extrusion head configured to extrude the coloring material in multi-step variable amounts of droplets. The controller is configured to control the amount of droplets of the coloring material extruded by the head for coloring.

18 Claims, 3 Drawing Sheets

(56) References Cited

U.S. PATENT DOCUMENTS

2016/0151975 A1* 6/2016 Hara .................. B29C 64/112
                                                       264/255
2018/0015667 A1    1/2018 Utsunomiya et al.

FOREIGN PATENT DOCUMENTS

| JP | 2016-64538 A | 4/2016 |
| JP | 2016150550 A | 8/2016 |
| WO | 03016031 A1 | 2/2003 |

OTHER PUBLICATIONS

Japanese Office Action (JPOA) dated Nov. 12, 2019 issued in the corresponding Japanese application No. 2016-165398 and its English translation.

* cited by examiner

FIG. 2A
|  | Extrude | Not extrude |  |
|---|---|---|---|
| 202 | L | None | <Two step> |
| 204 | L M S | None | <Four step> |
FIG. 2B
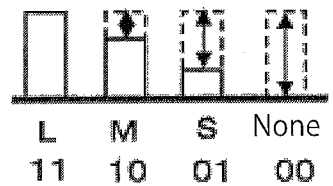
FIG. 2C
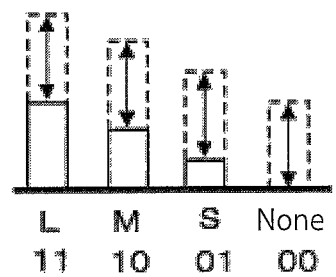

FORMING APPARATUS AND FORMING METHOD

CROSS-REFERENCE TO RELATED APPLICATIONS

The present application claims priority under 35 U.S.C. § 119 to Japanese Patent Application No. 2016-165398, filed Aug. 26, 2016. The contents of this application are incorporated herein by reference in their entirety.

BACKGROUND

Field of the Invention

The present disclosure relates to a forming apparatus and a forming method.

Discussion of the Background

JP2015-71282A1 discloses a forming apparatus (three-dimensional (3D) printer) that forms an object using ink-jet heads. In forming an object, the 3D printer utilizes additive manufacturing technology, which involves building up a plurality of layers of ink dispensed from the ink-jet heads.

The contents of JP2015-71282A1 are incorporated herein by reference in their entirety.

Recent trend is to develop a forming method performed with a forming apparatus for forming a colored object. For example, different coloring inks of a plurality of colors are used to form regions in the object the colors of which are visible from the outside, so that an object colored in various colors can be formed.

Representation of various colors using the coloring inks of a plurality of colors can be achieved by applying a configuration for representing various colors to ink-jet printers that print two-dimensional images, for example. It should be noted that, however, some additional points that may be irrelevant to two-dimensional image printing are desirably taken into consideration in an appropriate manner in coloring during formation of an object. For this purpose, it is necessary to form a colored object in a more appropriate manner. In light of the above circumstances, it is an object of the present disclosure to provide an improved forming apparatus and an improved forming method.

The inventor conducted research and study on methods of coloring an object in an appropriate manner during formation of the object. In this process, the inventor paid attention to a relation between features of a forming operation and the amounts of ink droplets extruded by ink-jet heads during formation of the object.

More specifically, for example, when an object is formed in additive manufacturing, a large number of layers of ink are added upon each other. The number of deposited layers of ink increases as the thickness of each layer of ink decreases. To achieve formation of an object at a practical formation speed, therefore, each layer of ink needs to be formed to some degree of thickness. In addition, ink droplets extruded by the ink-jet heads during formation of the object generally need to be in at least a sufficient amount.

In contrast, a large amount of ink droplets causes ink dots formed after hitting the surface to be large in size (dot size), and individual ink dots may stand out in the object. More specifically, a large dot size of coloring ink in formation of a colored object may lead to granular texture that may stand out, for example. As a result, a coloring result may give a not-smooth appearance, resulting in lowered formation quality, for example.

To reduce granular texture in a region (colored region) formed with coloring ink, the amount of ink droplets is preferably reduced. When coloring inks of a plurality of colors are used for coloring, formation of the colored region is performed using as many ink-jet heads as the colors to be used, for example. This means that even if the amounts of ink droplets extruded by the ink-jet heads for the respective colors are reduced, the amounts of ink extruded on respective positions on the colored region can be ensured in an appropriate manner in the total amount of ink extruded by the plurality of ink-jet heads. In this context, to simply reduce granular texture, a possible solution may be to reduce the amount of droplets extruded by the ink-jet head for extruding coloring ink.

The inventor also conducted research and study to find that simply reducing the amount of coloring ink droplets would make appropriate coloring difficult. More specifically, for example, if the amount of coloring ink droplets is reduced, the color of the formed layers of ink will generally become lighter. To color the object in a sufficiently dark color, the colored region needs to be made thicker. On the other hand, the colored region that is made thicker may absorb much light, resulting in a darker color, for example. This may make appropriate coloring difficult.

A possible way to prevent the colors of the layers of ink from becoming lighter even if the amount of coloring ink droplets is reduced may be to use dark color pigments as a coloring agent included in the ink, for example. In this case, however, granular texture may stand out even with a reduced amount of droplets of the coloring ink. In addition, if the amount of droplets of the coloring ink is reduced, the dot size of the ink after hitting a surface is generally reduced. In this case, concealment of the layers of ink is reduced and a region on the inner side of the colored region may be likely to be exposed.

In light of these circumstances, the inventor also conducted research and study to devise a configuration to extrude coloring ink in multi-step variable amounts, instead of simply reducing the amount of droplets, to find that this configuration provides a possible solution. The inventor conducted further research and study to find features necessary to implement these effects, which lead to the present disclosure.

SUMMARY

According to one aspect of the present disclosure, a forming apparatus configured to form a three-dimensional object includes a head configured to extrude build materials and a controller configured to control extrusion of the materials by the head. The three-dimensional object includes a colored region that is colored using a coloring material among the materials. The head includes a head for coloring that is an extrusion head configured to extrude the coloring material in multi-step variable amounts of droplets. The controller is configured to control the amount of droplets of the coloring material extruded by the head for coloring.

This configuration enables the amount of droplets to vary in multiple steps, for example, so that granular texture in the colored region can be prevented from standing out in a more appropriate manner than in the case in which the amount of droplets is fixed to a large amount. This configuration also enables that the amount of droplets is adjusted in an appropriate manner depending on accuracy requirements of the forming operation and coloring, for example. Thus, various problems attributed to the amount of droplets fixed to a small amount can be prevented in an appropriate manner, for example. This configuration ensures that the colored object is formed in a more appropriate manner, for example.

As used herein, the amount of droplets of the materials extruded refers to the amount of droplets extruded in one extrusion operation, for example. Also as used herein, a non-limiting example of the build materials is ink. A preferable example of the ink is ultraviolet curable ink, which cures upon exposure to ultraviolet light. This forming apparatus also includes a UV light source, for example.

The forming apparatus forms an object utilizing additive manufacturing by depositing the build materials in a preset deposition direction, for example. The forming apparatus preferably further includes a flattener configured to flatten deposited layers.

The forming apparatus forms an object including an inner region and a colored region, for example. As used herein, the inner region is a region constituting an inner part of the object. The colored region is formed on the outer side of the inner region, for example.

Beside the head for coloring that extrudes ink in multi-step variable amounts of droplets, the head may further include a fixed capacity head that is an extrusion head configured to extrude a single amount of droplets. As used herein, the fixed capacity head may mean an extrusion head with its amount of droplets controlled to be fixed. Thus, using fixed capacity heads may mean controlling the amount of droplets extruded by the extrusion head to be fixed to a single amount, for example. A fixed capacity head may be used as a head for forming the inner region that is an extrusion head configured to extrude the material for use in formation of the inner region, for example. The head may further include a clear ink head that is an extrusion head configured to extrude transparent clear ink. The colored region may be formed of clear ink, in addition to the coloring material.

The colored region may have different levels of color density depending on the position in a normal direction perpendicular to the outer surface of the object, for example. For example, the color of an inner part of the object is preferably darker and the color of an outer part of the object is preferably lighter. This configuration makes the color of the outer part, in which granular texture is likely to stand out, light and thus prevents the granular texture in a more appropriate manner, for example. This configuration further makes the color of the inner part, in which granular texture is less likely to stand out, dark and thus prevents an excess increase in the thickness of the colored region while making the colors of the entire colored region appropriately and sufficiently dark.

In this configuration, the color density at each position on the colored region may be adjusted by changing the amounts of droplets of the materials extruded. For example, the amount of droplets may be increased for an inner part of the colored region, so that the size of dots after hitting the surface can be increased and coloring in darker colors can be achieved. The amount of droplets is reduced for an outer part of the colored region, so that the size of dots after hitting the surface can be reduced and coloring in lighter colors can be achieved. This configuration ensures each position on the colored region to be colored at an appropriate density, for example. Increasing the dot size for the inner part may enhance the concealment of the colored region in an appropriate manner.

The present disclosure may be configured as a forming method having features similar to the above-described features. When the present disclosure is configured as a forming method, advantageous effects similar to the above-described advantageous effects of the forming method are provided.

The above-described embodiments of the present disclosure ensure that a colored object is formed in a more appropriate manner, for example.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIGS. 2A 2B, and 2C are diagrams illustrating an operation of forming a colored region 204 using variable capacity heads, and includes FIG. 2A illustrating an exemplary operation of a variable head, FIG. 2B illustrating an exemplary operation of causing an ink-jet head 102$t$ to form dots of multiple sizes at the time of formation of the colored region 204, and FIG. 2C illustrating an exemplary operation of the ink-jet head 102$t$ forming one size of dots at the time of formation of the colored region 204.

DESCRIPTION OF THE EMBODIMENTS

Figure 1A:
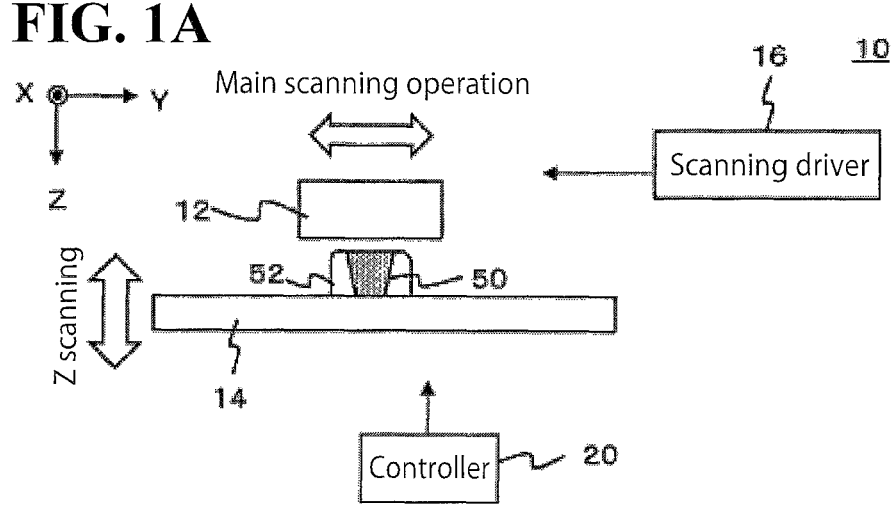
FIGS. 1A to 1C are diagrams illustrating an example of a forming apparatus 10 according to one embodiment of the present disclosure, and includes FIG. 1A illustrating an exemplary configuration of main elements of a forming apparatus 10, FIG. 1B illustrating an exemplary configuration of a head 12 of the forming apparatus 10, and FIG. 1C illustrating an exemplary configuration of an object 50 formed by the forming apparatus 10.
Figure 1B:
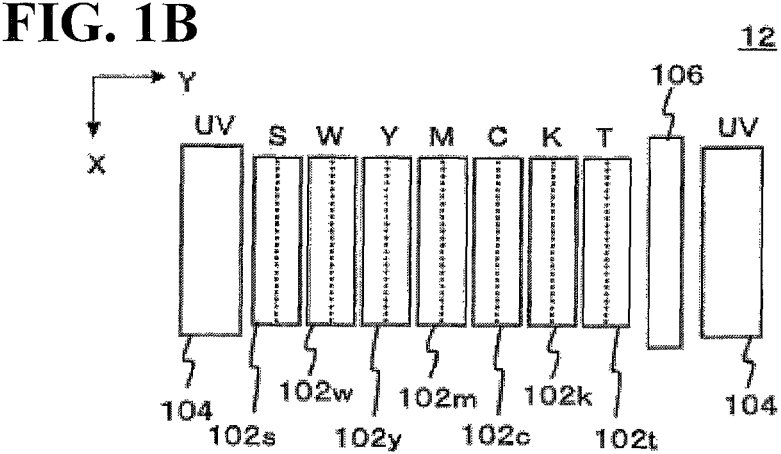
Figure 1C:
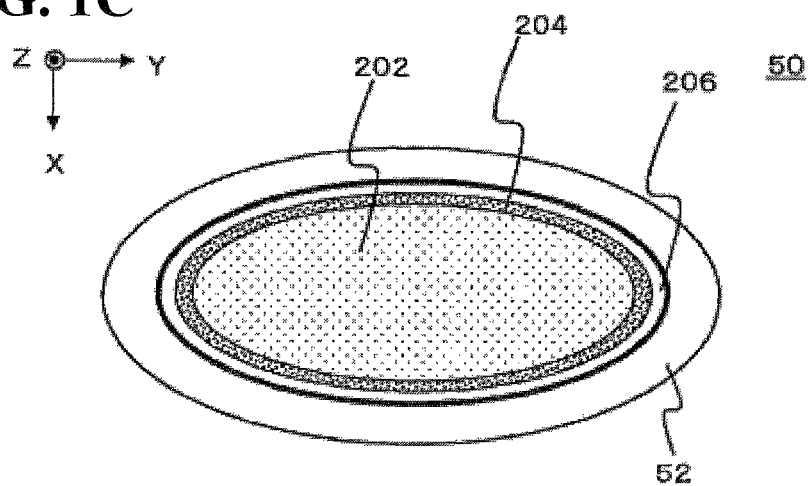

The embodiments will now be described with reference to the accompanying drawings, wherein like reference numerals designate corresponding or identical elements throughout the various drawings. FIGS. 1A to 1C illustrate an example of a forming apparatus 10 according to one embodiment of the present disclosure. FIG. 1A illustrates an exemplary configuration of main elements of the forming apparatus 10. FIG. 1B illustrates an exemplary configuration of a head 12 of the forming apparatus 10.

The forming apparatus 10 differs from known forming apparatuses in the respects described below, and otherwise may be the same as or similar to known forming apparatuses. For example, except for the respects described below, the forming apparatus 10 may have a configuration that is the same as or similar to a known forming apparatus that forms an object 50 using an ink-jet head that extrudes droplets (ink droplets) of build material of the object 50. For further example, the forming apparatus 10 may have, in addition to the illustrated elements, any of various other elements necessary for formation, coloring, and other operations associated with the object 50.

In this embodiment, the forming apparatus 10 is a forming apparatus (3D forming apparatus) that forms a three-dimensional object 50 by additive manufacturing. As used herein, additive manufacturing refers to a method by which the object 50 is formed by adding a plurality of layers upon each other. Also as used herein, the object 50 refers to a three-dimensional structure. In this embodiment, the forming apparatus 10 includes the head 12, a platform 14, a scanning driver 16, and a controller 20.

The head 12 extrudes build material of the object 50. In this embodiment, an ink is used as the build material of the object 50. In this case, the ink refers to a liquid extruded by the ink-jet head. The term ink-jet head refers to an extrusion head that extrudes droplets of ink by ink-jet method.

More specifically, the head 12 extrudes an ink curable under a predetermined condition(s) as the material of the object 50 from a plurality of ink-jet heads and causes the ink hitting a surface to cure. In this manner, the head 12 builds layers of the object 50. In this embodiment, an ultraviolet curable ink (UV ink) that is curable from its liquid state under ultraviolet light is used as the ink.

The head 12, which extrudes droplets of build material of the object 50, also extrudes droplets of material of a support layer 52. Thus, the forming apparatus 10 forms the support layer 52 around the object 50, as necessary. The support layer 52 is a layer structure that surrounds the outer surface of the object 50 being formed so as to support the object 50. The support layer 52 is formed, as necessary, during formation of the object 50 and removed after formation of the object 50 is completed. A specific configuration of the head 12 will be described later.

The platform 14 is a pedestal-shaped member supporting the object 50 being formed, and is disposed at a position opposed to the ink-jet heads of the head 12. The object 50 being formed is placed on the upper surface of the platform 14. Also in this embodiment, at least the upper surface of the platform 14 is movable in the deposition direction (Z direction illustrated in FIGS. 1A to 1C). More specifically, as the formation of the object 50 progresses, the scanning driver 16 drives at least the upper surface of the platform 14 into movement in the deposition direction. As used herein, for example, the deposition direction refers to a direction in which build materials are deposited in the additive manufacturing. More specifically, in this embodiment, the deposition direction refers to a direction orthogonal to the main scanning direction (Y direction illustrated in FIGS. 1A to 1C) and the sub-scanning direction (X direction illustrated in FIGS. 1A to 1C).

The scanning driver 16 is a driver that causes the head 12 to perform a scanning operation, as a movement of the head 12 relative to the object 50 being formed. For example, the movement relative to the object 50 being formed is a movement relative to the platform 14. In this embodiment, the scanning driver 16 causes the head 12 to perform main scanning operation (Y scanning), sub-scanning operation (X scanning), and deposition direction scanning (Z scanning).

As used herein, causing the head 12 to perform the main scanning operation refers to causing the ink-jet heads of the head 12 to perform the main scanning operation. Also as used herein, the main scanning operation refers to an operation performed by the head 12 to extrude ink while moving in the main scanning direction. In this embodiment, the scanning driver 16 causes the head 12 to perform the main scanning operation by causing the head 12 to move while keeping the position of the platform 14 fixed in the main scanning direction. For example, in a possible modification of the forming apparatus 10, it may be the object 50 that moves, which can be implemented by causing the platform 14 to move while keeping the position of the head 12 fixed in the main scanning direction.

As described in more detail later, in this embodiment, the head 12 may further include a UV light source. In the main scanning operation, the scanning driver 16 also drives the UV light source of the head 12. More specifically, the scanning driver 16 turns the UV light source on during the main scanning operation to cause the ink on the formed surface of the object 50 to cure. The formed surface of the object 50 refers to the last deposited layer of the object 50 that becomes the foundation upon which the next layer is formed by the head 12.

As used herein, causing the head 12 to perform the sub-scanning operation refers to causing the ink-jet heads of the head 12 to perform the sub-scanning operation. Also as used herein, the sub-scanning operation refers to a movement of the head 12 in the sub-scanning direction, which is approximately orthogonal to the main scanning direction, relative to the platform 14. More specifically, the sub-scanning operation refers to a movement of the head 12 over a predetermined forwarding distance in the sub-scanning direction relative to the platform 14.

Also in this embodiment, the scanning driver 16 causes the head 12 to perform the sub-scanning operation during the main scanning operation. More specifically, the scanning driver 16 causes the head 12 to perform the sub-scanning operation by causing the platform 14 to move while keeping the position of the head 12 fixed in the sub-scanning direction. In another possible embodiment, the scanning driver 16 may cause the head 12 to perform the sub-scanning operation by causing the head 12 to move while keeping the position of the platform 14 fixed in the sub-scanning direction. The scanning driver 16 causes the head 12 to perform the sub-scanning operation only when required according to the size of the object 50 to be formed. Thus, for example, a certain object 50 with a small size may be formed without requiring the sub-scanning operation.

As used herein, causing the head 12 to perform the deposition direction scanning refers to causing the ink-jet heads of the head 12 to perform the deposition direction scanning. Also as used herein, the deposition direction scanning refers to an operation to cause at least one of the head 12 and the platform 14 to move in the deposition direction, to cause the head 12 to move in the deposition direction relative to the object 50. As used herein, causing the head 12 to move in the deposition direction refers to causing at least the ink-jet heads of the head 12 to move in the deposition direction. Also as used herein, causing the platform 14 to move in the deposition direction refers to causing at least the position of the upper surface of the platform 14 to move in the deposition direction.

As the forming operation progresses, the scanning driver 16 causes the head 12 to perform the deposition direction scanning to adjust the positions of the ink-jet heads in the deposition direction relative to the object 50 being formed. More specifically, in this embodiment, the scanning driver 16 causes the platform 14 to move while keeping the position of the head 12 fixed in the deposition direction. Alternatively, the scanning driver 16 may cause the head 12 to move while keeping the position of the platform 14 fixed in the deposition direction.

A non-limiting example of the controller 20 is a CPU of the forming apparatus 10. The controller 20 controls the elements of the forming apparatus 10 to control an operation of forming the object 50. More specifically, the controller 20 preferably controls the elements of the forming apparatus 10 based on information associated with the object 50 to be formed such as shape information and color image information. This embodiment enables the object 50 to be formed in a more appropriate manner.

A specific configuration of the head 12 will be described below. In this embodiment, the head 12 includes a plurality of ink-jet heads. The ink-jet heads have an array of nozzles arranged in a predetermined nozzle array direction and disposed on the surface of the corresponding ink-jet head opposed to the platform 14. The forming apparatus 10 causes the plurality of arrays of nozzles of the head 12 to extrude the material to form the object 50.

More specifically, in this embodiment, the nozzle array direction is parallel to the sub-scanning direction. The head 12 includes a plurality of ink-jet heads, a plurality of UV light sources 104, and a flattening roller 106. As illustrated in FIG. 1B, the plurality of ink-jet heads include an ink-jet head 102s, an ink-jet head 102w, an ink-jet head 102y, an ink-jet head 102m, an ink-jet head 102c, an ink-jet head 102k, and an ink-jet head 102t. For example, the plurality of ink-jet heads are arranged in the main scanning direction and disposed at a position in the sub-scanning direction suitable for extruding purposes.

The ink-jet head 102s extrudes a material of the support layer 52. In this embodiment, the material of the support layer 52 includes an ultraviolet curable ink less ultraviolet-curable than the material of the object 50. The ink-jet head 102s extrudes the ultraviolet curable ink, as the material of the support layer 52, from each nozzle in the array of nozzles. More specifically, the material of the support layer 52 may be any known material for support layer use.

The ink-jet head 102w extrudes white (W color) ink, and extrudes the white ink from each nozzle in the array of nozzles. In this embodiment, the ink-jet head 102w is an example of a head for forming an inner region in the object 50. Thus, the inner region in the object 50 is formed with the white ink.

The white ink is also an example of light-reflecting ink, and is used for forming a light-reflecting region in the object 50. For example, the light-reflecting region reflects external light incident on the object 50 when a surface of the object 50 is colored with full color representation by subtractive mixing. For example, the full color representation is made by coloring with a suitable combination of inks of any process colors in the subtractive mixing. In this embodiment, the inner region is formed with the white ink and thus also functions as the light-reflecting region.

In a possible modification of the forming apparatus 10, the inner region and the light-reflecting region may be separately formed. In this configuration, the inner region may be formed with an ink other than the white ink. The head 12 may further include an ink-jet head that extrudes a build material ink (Mo ink) to form the inner region. For example, the build material ink is an ink dedicated to formation of the inner region in the object 50. In this embodiment, the ink-jet head that extrudes the build material ink may be regarded as a head for forming the inner region.

The ink-jet head 102y, the ink-jet head 102m, the ink-jet head 102c, and the ink-jet head 102k (hereinafter, referred to as ink-jet heads 102y to 102k) are ink-jet heads (coloring heads) for coloring when the colored object 50 is being formed. The inks (decorating inks) of a plurality of colors are extruded by the respective nozzles in the array of nozzles. More specifically, the ink-jet head 102y extrudes yellow color (Y color) ink, the ink-jet head 102m extrudes magenta color (M color) ink, the ink-jet head 102c extrudes cyan color (C color) ink, and the ink-jet head 102k extrudes black color (K color) ink. These colors YMCK are non-limiting examples of process colors for full color representation.

In this embodiment, the inks of the colors YMCK are non-limiting examples of inks of chromatic colors, and of coloring materials. The ink-jet heads 102y to 102k are each a variable capacity head (multi-value head, variable head) and can extrude droplets of ink in various amounts. Features related to the use of the ink-jet heads 102y to 102k with such a configuration are described in detail later.

The ink-jet head 102t is a clear ink-jet head for extruding clear ink, and extrudes clear ink through each nozzle in the array of nozzles. For example, the clear ink is colorless (transparent, T color) ink. In this embodiment, the ink-jet head 102t is disposed between the ink-jet heads 102y to 102k and the flattening roller 106.

The plurality of UV light sources 104 cause the above-described inks to cure. More specifically, the plurality of UV light sources 104 generate ultraviolet light to cause ultraviolet curable ink to cure. Also in this embodiment, one UV light source 104 is disposed at one end of the head 12 in the main scanning direction and the other UV light source 104 is disposed at the other end of the head 12 in the main scanning direction. Thus, the plurality of UV light sources 104 are arranged to hold the array of ink-jet heads between the plurality of UV light sources 104. A non-limiting example of the UV light source 104 is an ultraviolet light-emitting diode (UVLED). Other examples of the UV light source 104 include, but are not limited to, a metal halide lamp and a mercury lamp.

The flattening roller 106 is a non-limiting example of the flattener recited in the appended claims, and flattens the layers of ink formed during formation of the object 50. In the main scanning operation, the flattening roller 106 removes part of the ink that is not cured yet while keeping in contact with the outermost layer of ink. In this manner, the flattening roller 106 flattens the layer of ink.

The head 12 having this configuration ensures that the layers of ink of the object 50 are formed in a more appropriate manner. The object 50 is formed in a more appropriate manner with a plurality of layers of ink.

A specific configuration of the head 12 will not be limited to the above-described configuration but may be implemented in any of various other forms. For example, the ink-jet heads for coloring of the head 12 may further include an additional ink-jet head(s) for some color(s) other than the colors YMCK. The plurality of ink-jet heads of the head 12 may be arranged in various other manners. For example, one or some of the ink-jet heads may be shifted in the sub-scanning direction relative to other ink-jet heads.

An exemplary configuration of the object 50 formed by the forming apparatus 10 will be described. FIG. 1C is a diagram illustrating an exemplary configuration of the object 50 formed by the forming apparatus 10, illustrating an exemplary configuration of a cross-section of the object 50 as a three-dimensional ellipsoid, formed by the forming apparatus 10, and a cross-section of the support layer 52. The cross-sectional view in FIG. 1C is taken along the X-Y cross-section orthogonal to the Z direction. Cross-sectional views of this object 50 taken along the Z-X cross-section and the Z-Y cross-section, respectively orthogonal to the Y direction and the Z direction, illustrate similar configurations.

As described above, the head 12 of the forming apparatus 10 in this embodiment uses the ink-jet heads 102y to 102k that extrude coloring inks to form the object 50 with a colored surface. Non-limiting examples of the object 50 with a colored surface include an object 50 having externally visible regions at least partially colored. As illustrated in FIG. 1C, in this embodiment, the object 50 with a colored surface, formed by the forming apparatus 10, includes an inner region 202, a colored region 204, and a protection region 206. The support layer 52 is formed around the object 50, as necessary.

The inner region 202 is a region (core), inside the object 50, defining the shape of the object 50. In this embodiment, the head 12 uses the white ink extruded by the ink-jet head 102w to form the inner region 202. In this manner, the inner region 202 also functions as the light-reflecting region as described above.

The colored region 204 is a region (color layer) that is colored by coloring inks extruded by the ink-jet heads 102y to 102k. In this embodiment, as illustrated in FIG. 1C, the colored region 204 is a layered region formed along the surface shape of the object 50. The head 12 uses coloring inks of a plurality of colors and clear ink extruded by the ink-jet head 102t to form the colored region 204 around the inner region 202. In this embodiment, the coloring inks of various colors are extruded in controlled amounts to respective positions, so that a wide variety of colors are represented. Clear ink is additionally used to compensate for the change in the amounts (amount of extrusion per unit volume) of the coloring inks caused by different colors to represent. This configuration ensures that the positions on the colored region 204 are colored in desired colors in a more appropriate manner. This configuration also ensures that the colored region 204 colored in coloring inks is formed in a more appropriate manner.

The compensation using the clear ink ensures more uniform height of the colored region 204 being formed, before the flattening is performed with the flattening roller 106. Thus, this embodiment ensures that the flattening is performed with the flattening roller 106 in a more appropriate manner. As described above, in this embodiment, the ink-jet head 102t that extrudes the clear ink is disposed between the ink-jet heads 102y to 102k and the flattening roller 106, as illustrated in FIG. 1B. In this embodiment, in the main scanning operation involving flattening performed with the flattening roller 106, the clear ink is extruded over the coloring inks (inks of the colors YMCK). This configuration ensures that the flattening is performed with the flattening roller 106 in contact mainly with the clear ink. This configuration prevents the coloring ink from being dragged by the flattening roller 106. Such a feature of this embodiment further facilitates an attempt to perform the flattening performed with the flattening roller 106 in a more appropriate manner. How the colored region 204 is formed will be described in detail later.

The protection region 206 is a transparent region for protecting the outer surface of the object 50. In this embodiment, the head 12 uses the clear ink extruded by the ink-jet head 102t to form the protection region 206 around the colored region 204. Forming the regions in the manner described above ensures that the object 50 with a colored surface is formed in a more appropriate manner.

In a possible modification of the object 50, the object 50 may have a specific configuration different from the configuration described above. More specifically, a light-reflecting region may be formed between the inner region 202 and the colored region 204, separately from the inner region 202, for example. In this configuration, the inner region 202 may be formed of ink other than the white ink. For example, the inner region 202 may be formed of any ink other than the materials of the support layer 52. For example, the light-reflecting region and the colored region 204 may be separately formed with an isolation region interposed therebetween. The isolation region is formed of clear ink, for example, and prevents mixing of the white ink constituting the light-reflecting region and the coloring ink constituting the colored region 204.

Features related to the use of variable capacity heads serving as the ink-jet heads 102y to 102k and how to form the colored region 204 will be described in more detail below. FIGS. 2A, 2B, and 2C are diagrams illustrating an operation of forming the colored region 204 using the variable capacity heads. FIG. 2A is a diagram illustrating an exemplary operation of a variable head.

In this embodiment, among the plurality of ink-jet heads 102s to 102t (see FIG. 1B) of the head 12 (see FIG. 1A), at least the ink-jet heads 102y to 102k for coloring are variable capacity heads. The ink-jet head 102t for extruding clear ink for use in formation of the colored region 204, as well as the heads for extruding the coloring ink, may also be variable capacity heads. Among the plurality of ink-jet heads 102s to 102t of the head 12, the ink-jet head 102s and the ink-jet head 102w, which are not used for forming the colored region 204, are not variable capacity heads, but fixed capacity heads (binary head) configured to extrude a single amount of ink droplets. As used herein, fixed capacity heads may be ink-jet heads with its amount of droplets controlled to be fixed, for example. Thus, using fixed capacity heads may mean controlling the amount of droplets extruded by the ink-jet heads to be fixed to a single amount, for example.

At the time of the forming operation, the controller 20 (see FIG. 1A) controls the extrusion of ink from the ink-jet heads 102s to 102t of the head 12, so that the elements of the object 50 (see FIGS. 1A and 1C) and the support layer 52 (see FIGS. 1A and 1C) can be formed. The controller 20 also controls the amount of ink extruded by the ink-jet heads 102y to 102k and the ink-jet head 102t, which are variable capacity heads.

More specifically, the inner region 202 in the region constituting the object 50 is formed, using the ink-jet head 102w, only with dots of a predetermined uniform size (fixed size) corresponding to the single amount of droplets. More specifically, in this embodiment, dots of the uniform size are dots of a predetermined large size (L size). The controller 20 causes the ink-jet head 102w for use in formation of the inner region 202 to set either of whether or not to extrude ink for various amounts of droplets extruded on each position on the formed surface of the object 50. The controller 20 thus causes the ink-jet head 102w to operate a two-step gradation operation of whether or not to form ink dots of a predetermined size on each position.

In the region constituting the object 50, the colored region 204 is formed using the ink-jet heads 102y to 102k and the ink-jet head 102t. At least the ink-jet heads 102y to 102k form multiple sizes of dots corresponding to multiple amounts of droplets. More specifically, in this embodiment, the multiple sizes are three sizes of L, M. and S. Among these, L size dots have the same size as that of ink dots formed by the ink-jet head 102w. M size dots are smaller than L size dots. S size dots are smaller than M size dots.

The controller 20 causes the ink-jet heads 102y to 102k for use in formation of the colored region 204 to operate whether or not to extrude ink on each position on the formed surface of the object 50. If ink is to be extruded, the controller 20 causes the ink-jet heads 102y to 102k to extrude ink droplets of an amount corresponding to either size of L, M, or S. The controller 20 thus causes the ink-jet head 102w to operate a four-step gradation operation of which of the three sizes of dots is to be formed and whether to form dots on each position.

This configuration causes the ink-jet heads 102y to 102k to extrude ink in multi-step variable amounts of droplets, for example, so that granular texture in the colored region 204 can be prevented from standing out in an appropriate manner than in the case in which the amount of droplets is fixed to a large amount. This configuration also enables that the amount of droplets is adjusted in an appropriate manner depending on accuracy requirements of the forming operation and coloring, for example. Thus, various problems attributed to the amount of droplets fixed to a small amount can be prevented in an appropriate manner, for example. This configuration ensures that the colored object 50 is formed in a more appropriate manner.

As used herein, the amount of ink droplets refers to the amount of ink droplets extruded in one extrusion operation, for example. Also in this embodiment, the size of dots (dot size) refers to a design size, for example. During the forming operation, the controller 20 may cause the ink-jet heads 102y to 102k not to form dots of all the sizes of L, M, and S, but to form dots of one or two of these sizes. For example, the controller 20 may cause the ink-jet heads 102y to 102k to form dots of only the M and S sizes. This configuration may reduce the size of coloring ink dots and thus ensure that granular texture is reduced in a more appropriate manner, for example.

As described above, in this embodiment, the colored region 204 is formed using the ink-jet heads 102y to 102k and the ink-jet head 102t. Also in this embodiment, at least the ink-jet heads 102y to 102k are caused to form dots of multiple sizes. Also in this embodiment, the ink-jet head 102t may be caused to form dots of multiple sizes as described below with reference to FIG. 2B, while the ink-jet head 102t may be caused to form dots of a uniform size as illustrated below with reference to FIG. 2C, for example.

FIG. 2B is a diagram illustrating an exemplary operation of causing the ink-jet head 102t to form dots of multiple sizes at the time of formation of the colored region 204, illustrating a modeled example of how to set the amount of ink droplets extruded by the ink-jet head 102t. As described above, clear ink is used in formation of the colored region 204 to compensate for the change in the amounts of (amount of extrusion per unit volume) coloring inks caused by different colors on each position on the colored region 204, for example. More specifically, at the time of formation of the colored region 204, the controller 20 causes the ink-jet heads 102y to 102k to change the amount of ink droplets they extrude on positions depending on the colors to be provided to the respective positions on the colored region 204, for example. The amount of the clear ink extruded by the ink-jet head 102t on the positions is set depending on the total amount of ink extruded by the ink-jet heads 102y to 102k on the respective positions.

As used herein, setting the amount of clear ink extruded by the ink-jet head 102t on the respective positions refers to setting the number of droplets of clear ink extruded by the ink-jet head 102t on the respective positions, for example. The number of droplets of clear ink extruded by the ink-jet head 102t on the respective positions refers to the total number of droplets of clear ink extruded by the ink-jet head 102 on the same position during the forming operation of one layer of ink, for example. The same position refers to the position of each volumetric pixel determined based on the forming resolution. For example, if a plurality of main scanning operations are performed to form one layer of ink, such as in the case of multi-path type forming, the total number of droplets refers to the total number of droplets extruded during the plurality of main scanning operations.

In the embodiment illustrated in FIG. 2B, the ink-jet head 102t is caused to extrude clear ink in multi-step variable amounts of droplets to form dots of multiple sizes. This configuration enables the amount of droplets of the clear ink extruded by the ink-jet head 102t to be set depending on the amount of ink droplets extruded by the ink-jet heads 102y to 102k. More specifically, the controller 20 sets the amount of droplets of the clear ink extruded by the ink-jet head 102t on the positions based on the amount of ink droplets extruded by the ink-jet heads 102y to 102k on the respective positions on the colored region 204, for example.

More specifically, in this embodiment, the controller 20 specifies the amount of droplets extruded by the ink-jet heads 102y to 102k, using values of 11, 10, 01, and 00, which are two-bit data, for example. In this embodiment, the amount of ink droplets corresponding to each of the dot size of L, M, and S, using values of 11, 10, and 01, for example. Using the value of 00 enables control so as not to extrude any ink. The amount of ink droplets extruded by the ink-jet head 102t is changed opposite to the amount of ink droplets extruded by the ink-jet heads 102y to 102k, as indicated by the arrows in FIG. 2B. This configuration enables the ink-jet heads 102y to 102k and the ink-jet head 102t to extrude the uniform amount of ink on each position on the colored region 204.

This configuration makes the amount of ink to be removed during the flattening operation of the flattening roller 106 (see FIG. 1B) substantially uniform irrespective of the dot size of ink formed by the ink-jet heads 102y to 102k, for example. This configuration thus prevents the total amount of ink extruded on each position on the colored region 204 from becoming excessively large in an appropriate manner, for example. This configuration also reduces the amount of ink discarded during the flattening operation in an appropriate manner, for example.

To make the control of the forming operation simpler, the ink-jet head 102t may be caused to form only one dot size of ink at the time of formation of the colored region 204, for example. FIG. 2C is a diagram illustrating an exemplary operation of the ink-jet head 102t forming one size of dots at the time of formation of the colored region 204, illustrating a modeled example of relation between the amount of ink droplets extruded by the ink-jet heads 102y to 102k and the amount of ink droplets extruded by the ink-jet head 102t. The ink-jet head 102t forms only L size dots, for example, as the ink-jet head 102w does.

This configuration eliminates the need for the setting of the amount of ink droplets extruded by the ink-jet head 102t, and thus makes the control of the forming operation simpler, for example. This configuration also enables that the speed of data processing during the formation is increased in an appropriate manner, for example.

In this embodiment, the amount of droplets extruded by the ink-jet head 102t is set in such a manner that the ink-jet heads 102y to 102k are positioned not to extrude ink, and the total amount of ink at such positions becomes a sufficient for the flattening operation, for example. Thus, for example, as indicated by the arrows in FIG. 2C, the amount of ink droplets extruded by the ink-jet head 102t is uniform irrespective of the amounts of ink droplets extruded by the ink-jet heads 102y to 102k. This configuration ensures the total amount of ink to be sufficiently large, even when the ink-jet heads 102y to 102k are positioned so as not to extrude ink or the ink-jet heads 102y to 102k are positioned so as to form only S size dots, for example. This configuration causes the flattening roller 106 to remove extra clear ink for flattening, and thus enables that the layers of ink are flattened in an appropriate manner, for example.

The forming apparatus 10 (see FIG. 1A) preferably performs the operation of the ink-jet head 102t either as illustrated in FIG. 2B or in FIG. 2C. This configuration prevents the configuration or control of the forming apparatus 10 from becoming complicated in an appropriate manner, for example. In a possible modification of the forming apparatus 10, the operation mode may be selected in such a manner that the operation of the ink-jet head 102t can be set to both as illustrated in FIG. 2B and in FIG. 2C, for example.

Next, how to form the colored region 204 will be described in more detail. As described above, this embodiment causes the ink-jet heads 102y to 102k to extrude ink in multi-step variable amounts of droplets, so that granular texture in the colored region 204 can be prevented from standing out in an appropriate manner. More specifically, to reduce granular texture in the colored region 204, the amount of droplets extruded by the ink-jet heads 102y to 102k is preferably set to a small amount to form small ink dots.

If the ink dots formed by the ink-jet heads 102y to 102k are made uniformly small, the color density of the colored region 204 per unit thickness may decrease. As a result, for example, the colored region 204 needs to be made thicker in order to represent dark colors. As used herein, the thickness of the colored region 204 is a thickness in a normal direction perpendicular to the outer surface of the object. On the other hand, the colored region 204 that is made thicker may absorb much light, resulting in a darker color, for example. As a result, appropriate representation of desired colors may be failed.

If ink dots formed by the ink-jet heads 102y to 102k are uniformly made small, the gap between dots may be enlarged. As a result, concealment of the layers of ink in the colored region 204 may be lowered. More specifically, at the time of formation of the colored region 204, if there is an error in the hitting positions of ink droplets, colors in the inner region 202 inside the object 50 may be easily exposed through the gap between dots, for example. Even if there is no such error, colors in the inner region 202 may be exposed in some cases. For this reason, at the time of formation of the colored region 204, larger size (for example, M size) dots are preferably formed together with the smallest S size dots.

The granular texture in the colored region 204 is much influenced by the dot size of ink formed especially in an outer part of the colored region 204. As used herein, the outer part refers to an outer part of the object 50. To reduce granular texture while ensuring color density in the entire colored region 204, smaller size (for example, S size) dots are preferably included in a ratio adjusted to increase in the outer part of the colored region 204.

Figure 3A:
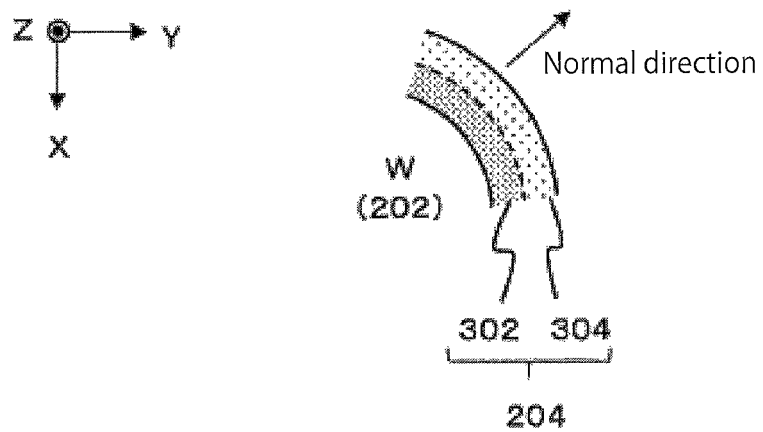
FIGS. 3A, 3B, and 3C are diagrams illustrating an exemplary method of coloring the colored region 204, and includes FIG. 3A illustrating an exemplary configuration of a cross-section of the colored region 204 and an inner region 202, along a plane perpendicular to the deposition direction, FIG. 3B being a cross-sectional view illustrating an exemplary configuration of a part of the colored region 204 other than the part illustrated in FIG. 3A, and FIG. 3C being a cross-sectional view illustrating a possible modification of the colored region 204.
Figure 3B:
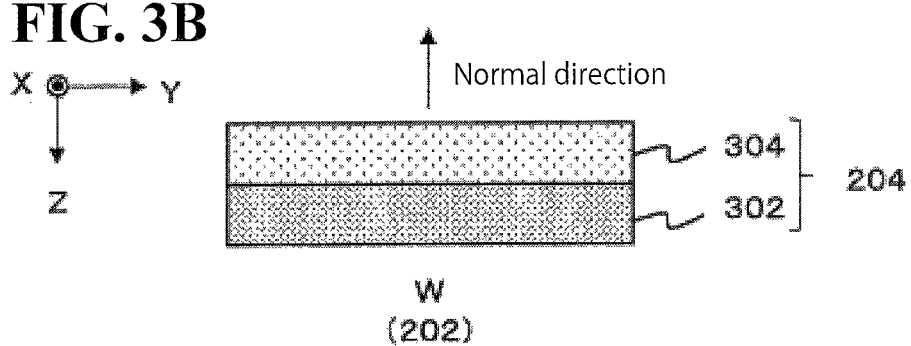
Figure 3C:
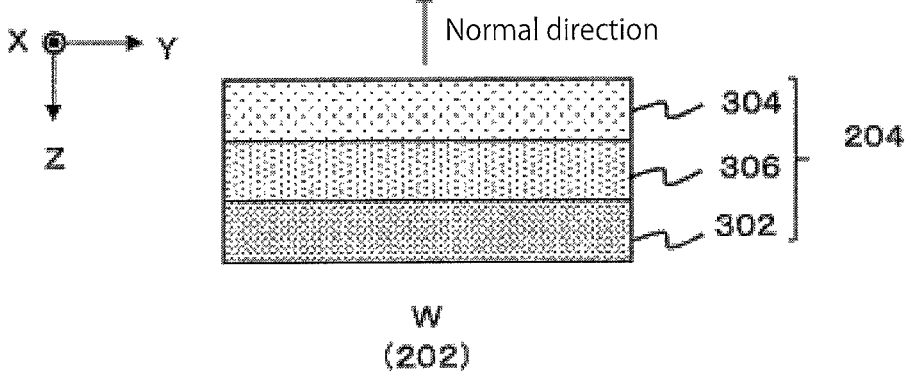

This configuration may be considered as a configuration achieved by causing the colored region 204 to have various levels of color density depending on the position in the normal direction of the object 50, for example. FIGS. 3A, 3B, and 3C are diagrams illustrating an exemplary method of coloring the colored region 204, illustrating an exemplary configuration of the colored region 204 with various levels of color density depending on the position in the normal direction of the object 50. FIG. 3A illustrates an exemplary configuration of a cross-section of the colored region 204 and the inner region 202, along a plane perpendicular to the deposition direction.

In this embodiment, the controller 20 (see FIG. 1A) causes the ink-jet heads 102y to 102k (see FIG. 1B) to color at least part of the colored region 204 in such a manner that the color of an inner part of the object 50 (see FIG. 1C) in the normal direction is darker than the color of an outer part of the object 50. This configuration makes the color of the outer part, in which granular texture is likely to stand out, light and thus prevents the granular texture in a more appropriate manner, for example. This configuration further makes the color of the inner part, in which granular texture is less likely to stand out, dark and thus prevents an excess increase in the thickness of the colored region 204 while making the colors of the entire colored region 204 appropriately and sufficiently dark.

More specifically, in this embodiment, the colored region 204 includes an inner side region 302 and an outer side region 304. The inner side region 302 refers to a region on the inner side of the colored region 204. The outer side region 304 refers to a region on the outer side of the colored region 204. The colored region 204 is colored in such a manner that the color of the outer side region 304 is lighter than the color of the inner side region 302.

Also in this embodiment, the color density at each position on the colored region 204 is adjusted by changing the amounts of ink droplets extruded by the ink-jet heads 102y to 102k, for example. For this purpose, for example, the amount of droplets is increased for the inner side region 302, which is an inner part of the colored region 204, so that the size of dots after hitting the surface can be increased and coloring in darker colors can be achieved. The amount of droplets is reduced for the outer side region 304, which is an outer part of the colored region 204, so that the size of dots after hitting the surface can be reduced and coloring in lighter colors can be achieved. This configuration ensures each position on the colored region 204 to be colored at an appropriate density, for example. Increasing the dot size for the inner side region 302 may enhance the concealment of the colored region 204 in an appropriate manner.

As used herein, the size of dots in the inner side region 302 and the outer side region 304 refers to an average dot size in each region, for example. Also as used herein, the average dot size refers to the average dot size of ink dots formed by the ink-jet heads 102y to 102k for coloring. The average dot size is the average of the diameters of dots, for example.

Reducing the dot size means that the ratio of small dots (for example, S size dots) to the ink dots constituting the region is increased. Also in this embodiment, only the smallest S dots may be formed among the dots that can be formed by the ink-jet heads 102y to 102k as coloring ink dots for the outer side region 304, for example.

Increasing the dot size means that the ratio of small dots to the ink dots constituting the region is decreased, for example. Increasing the dot size may means that the ink dots constituting the region does not include small dots but includes only larger dots (for example, M or larger size dots). For this purpose, in this embodiment, only dots other than S dots (for example, M size dots) may be formed among the dots that can be formed by the ink-jet heads 102y to 102k as coloring ink dots for the inner side region 302, for example.

The method for forming the colored region 204 including the inner side region 302 and the outer side region 304 as described above may be generalized as follows: The ratio of the smallest S size dots to the dots that can be formed by the ink-jet heads 102y to 102k is herein defined as a small dot ratio. The controller 20 causes the ink-jet heads 102y to 102k to form ink dots in such a manner that the small dot ratio in the inner part of at least part of the colored region 204 in the normal direction is smaller than the small dot ratio in the outer part, for example. This configuration ensures that the darker inner side region 302 and the lighter outer side region 304 are formed in an appropriate manner, and that the colored region 204 is colored in an appropriate manner, for example.

The above-described configuration of the colored region 204 can be described in terms of the average diameter of dots formed by the ink-jet heads 102y to 102k on respective positions in the normal direction. More specifically, this may involve calculating the average diameter of the dots formed on respective positions of at least part of the colored region 204 in the normal direction, and setting a smaller average diameter of the dots for a second position that is on the outer part of a first position in the normal direction than the average diameter of the dots for the first position in the normal direction, for example.

Ink dots formed in this embodiment, after hitting the surface, expand and cure. As a result, the shapes of dots expand in in-plane directions of the formed surface. To differentiate the average diameters of dots for the inner side region 302 and the outer side region 304, these regions are preferably formed to have widths that enable forming of one or more dots in the regions. Also in this embodiment, the thickness of the colored region 204 in the normal direction including both the inner region 202 and the colored region 204 is preferably more than double the diameter of the largest L size dots among the dots that can be formed by the ink-jet heads 102y to 102k.

When formation in additive manufacturing is performed, a plurality of formed ink dots are formed side by side with gaps therebetween determined based on the forming resolution in the operation of forming each layer of ink. To increase the speed of formation, dots are preferably formed to some degree of size. This may be achieved by making the diameter of at least L size dots larger than the gaps therebetween, which are determined based on the resolution, so that a plurality of dots formed will overlap with each other in one layer of ink. As a result, the thickness of one layer of ink in the deposition direction (Z direction) is larger than the height of one dot.

In this context, the thicknesses of the inner side region 302 and the outer side region 304 in the normal direction are preferably set in consideration of the thicknesses of the layers of ink. In this embodiment, each region constituting the colored region 204 preferably has a thickness large enough to include one or more layers of ink. This configuration ensures the inner side region 302 and the outer side region 304 to have appropriately different average diameters of dots formed in these regions, for example.

FIG. 3B is a cross-sectional view illustrating an exemplary configuration of a part of the colored region 204 other than the part illustrated in FIG. 3A, illustrating an exemplary configuration of a part in which the normal direction and the deposition direction of the object 50 are parallel to each other. This part is a topmost part of the object 50 in the deposition direction, for example.

During formation of the part illustrated in FIG. 3B, the forming apparatus 10 deposits, on the inner region 202, the inner side region 302 and the outer side region 304, resulting in the colored region 204 formed. Each of the inner side region 302 and the outer side region 304 is formed by depositing one or more layers of ink. This configuration ensures that the colored region 204 including the inner side region 302 and the outer side region 304 is formed in an appropriate manner, for example.

Some of the various advantageous effects of the forming apparatus 10 will be described below with additional notes and modifications. As described above, in this embodiment, among the plurality of ink-jet heads 102s to 102t of the head 12, only the ink-jet head for use in formation of the colored region 204 is a variable capacity head. This configuration ensures that granular texture in the colored region 204 is reduced in an appropriate manner without decreasing the speed of formation, for example.

More specifically, an ink-jet head that can form large size dots is used as the ink-jet head 102w for use in formation of the inner side region 302 of the object 50 in view of higher speed formation. Also in this embodiment, an ink-jet head that can form large size dots is preferably used as the ink-jet head 102s for use in formation of the support layer 52 (see FIG. 1C), like the ink-jet head 102w. In contrast, variable capacity heads are used as the ink-jet heads 102y to 102k in view of high image quality for the colored region 204, thereby reducing granular texture in the region. This configuration ensures high quality coloring without decreasing the speed of formation.

Also in this embodiment, the inner region 202 is a region formed only by one type of ink-jet head (ink-jet head 102w). For this region, reducing the size of ink dots formed by the ink-jet head 102w reduces the amount of ink extrusion per unit area per unit time and decreases the speed of formation. To prevent a decrease in the speed of formation while reducing the size of ink dots formed small, for example, a larger number of ink-jet heads 102w may be required.

In contrast, the ink-jet head 102t in addition to the ink-jet heads 102y to 102k is used for formation of the colored region 204 as described above. In this case, even if the size of ink dots formed by the ink-jet heads 102y to 102k is reduced, the total amount of ink extrudable per unit area per unit time is equal to or more than the amount of ink extruded by the ink-jet head 102w to the inner region 202. Thus, reducing the size of ink dots formed by the ink-jet heads 102y to 102k will not decrease the speed of formation. There is no need to increase the number of ink-jet heads in order to prevent a reduction in the speed. This configuration thus ensures high quality coloring without a large increase in cost, for example.

Another possible way to increase the size of ink dots formed by the ink-jet head 102w is to use a variable capacity head as the ink-jet head 102w to form large size dots (for example, L size dots). Unfortunately, this configuration involves more control requirements than those for the required performance and increased cost accordingly. For this reason, a fixed capacity head is preferably used as the ink-jet head 102w, instead of a variable capacity head. Using fixed capacity heads may mean controlling the amount of droplets extruded by the ink-jet heads to be fixed to a single amount, for example. Likewise, a fixed capacity head is preferably used as the ink-jet head 102s for use in formation of the support layer 52, among the ink-jet heads 102s to 102t of the head 12. In a modification of the forming apparatus 10, variable capacity heads may be used as the ink-jet head 102w and the ink-jet head 102s in accordance with the quality required for the object 50, for example. This configuration ensures that the object 50 is formed in an appropriate manner with improved accuracy, for example.

In this embodiment, as described above, using variable capacity heads as the ink-jet heads 102y to 102k enables coloring with improved accuracy. In this sense, simply using variable capacity heads as ink-jet heads for coloring has been practiced for conventional ink-jet printers, which print two-dimensional images. What characterizes this embodiment is that, as described above, the object 50 is colored by a specific method at the time of formation of the object 50. This leads to various features that differentiate the operation of this embodiment from that of conventional ink-jet printers.

More specifically, for example, ink-jet printers draw images by forming one layer of ink. In this embodiment, the colored object 50 is formed by adding a plurality of layers of ink upon each other. This formation forms the colored region 204 including a plurality of regions such as the inner side region 302 and the outer side region 304, for example. Also in this embodiment, the inner side region 302 and the outer side region 304 have different levels of color density. In this context, various features of this embodiment can be considered as being specific to the forming apparatus configured to form the three-dimensional object 50.

In the above-described configuration, the configuration of the colored region 204 including the inner side region 302 and the outer side region 304 has been described. In a modification of the colored region 204, however, the colored region 204 may further include additional regions.

FIG. 3C is a cross-sectional view illustrating a possible modification of the colored region 204. Except for the respects described below, the components in FIG. 3C denoted with the same reference numerals as used in FIG. 3B have features the same as or similar to the features of the components in FIG. 3B.

In this modification, the colored region 204 further includes an intermediate region 306, in addition to the inner side region 302 and the outer side region 304. The intermediate region 306 is disposed between the inner side region 302 and the outer side region 304. The intermediate region 306 is colored in such a manner that the color of the intermediate region 306 is lighter than the inner side region 302 and is darker than the outer side region 304, for example. More specifically, the average diameter of ink dots formed by the ink-jet heads 102$y$ to 102$k$ may be set in such a manner that the average diameter of dots for the intermediate region 306 is set to be smaller than the average diameter of dots for the inner side region 302 and larger than the average diameter of dots for the outer side region 304. This configuration ensures that the colored region 204 is colored in an appropriate manner with a more natural appearance, for example. The features of this modification may be generalized in terms of the operation of the controller 20 (see FIG. 1A) as follows: the ink-jet heads 102$y$ to 102$k$ may be caused to color at least part of the colored region 204 in such a manner that the color of the object 50 becomes darker toward the inner side. This configuration can be considered as a configuration that provides a smaller dot size toward the outer side (outermost layer) in the colored region 204. This configuration ensures, as described above, that the granular texture in the colored region 204 is reduced, concealment of the colored region 204 is enhanced in an appropriate manner, and the inner color of the object 50 is prevented from being exposed in an appropriate manner. In another modification, a plurality of intermediate regions 306 may be formed between the inner side region 302 and the outer side region 304, for example. In this case, the intermediate regions 306 preferably have different levels of color density so that the color of an intermediate region 306 on the outer side lighter than the color of an intermediate region 306 on the inner side.

As described above, to reduce granular texture in the colored region 204, coloring ink dots are preferably small dots. To achieve this, ink may be extruded to be divided into a plurality of droplets during formation of S size dots, for example. As used herein, dividing ink extruded into a plurality of droplets means that ink extruded in one extrusion operation is divided into a plurality of droplets, with respect to a waveform of a drive signal for controlling a drive element (for example, piezoelectric element) that controls nozzles of ink-jet heads to extrude ink for example. This configuration ensures that smaller ink dots as specified in the specifications of predetermined ink-jet heads are formed in an appropriate manner, for example. As used herein, non-limiting examples of the specifications of predetermined ink-jet heads include the level of gradation (the number of channels) and the minimum amount (mindot) of extrudable droplets.

In the above-described configuration, adjustment levels of the color density of each region in the colored region 204 by causing the ink-jet heads 102$y$ to 102$k$ to form different sizes of dots has been described. In light of the objective of providing different levels of color density for respective regions in the colored region 204, another possible way may involve adjusting levels of the color density by any other method than the method for forming different sizes of dots. More specifically, a plurality of types of inks having different levels of color density may be used for at least part of the colors used for coloring (for example, each of the YMCK colors), so that levels of the color density can be adjusted, for example.

More specifically, ink-jet heads for extruding lighter colors of ink may be further used for the M color and the C color among the YMCK colors, for example. In this case, using a larger amount of lighter ink in formation of the outer side region 304, among, the inner side region 302 and the outer side region 304 in colored region 204 ensures that the color density of the outer side region 304 is lower than that of the inner side region 302, for example. This configuration ensures that granular texture in the colored region 204 is reduced in an appropriate manner, for example. This configuration thus ensures that granular texture in the colored region 204 is reduced and the object 50 is formed with improved accuracy, for example. In this configuration, ink-jet heads for extruding lighter colors of ink may be further used for colors other than the M color and the C color (for example, the Y color or the K color).

The embodiments of the present disclosure find applications in, but not limited to, forming apparatuses.

10 . . . forming apparatus, 12 . . . head, 14 . . . platform, 16 . . . scanning driver, 20 . . . controller, 50 . . . object, 52 . . . support layer, 102 . . . ink-jet head, 104 . . . UV light source, 106 . . . flattening roller, 202 . . . inner region, 204 . . . colored region, 206 . . . protection region, 302 . . . inner side region, 304 . . . outer side region. 306 . . . intermediate region

What is claimed is:

1. A forming apparatus configured to form a three-dimensional object, the forming apparatus comprising:
   a head configured to extrude build materials; and
   a controller configured to control extrusion of the materials by the head,
   wherein the three-dimensional object includes a colored region that is colored using a coloring material among the materials,
   wherein the head includes:
   a plurality of heads for coloring configured to extrude coloring ink of different colors; and
   a clear ink head that is an extrusion head configured to extrude transparent clear ink, wherein the forming apparatus further comprises a flattening roller configured to flatten an upper surface of layers of the materials while the materials are deposited, wherein the controller is configured to control the head to perform a main scanning operation in which the head is moved in a main scanning direction orthogonal to a deposition direction in which the materials are deposited, while controlling the head to extrude the coloring ink and the clear ink, wherein the plurality of heads for coloring are arranged in the main scanning direction and aligned with the clear ink head and the flattening roller in a sub-scanning direction orthogonal to the main scanning direction and the plurality of heads for coloring are arranged behind the clear ink head in a moving direction of the head in the main scanning operation, wherein the plurality of heads for coloring and the clear ink head are configured to extrude the material in multi-step variable amounts of droplets, wherein the controller is configured to control the amount of droplets of the coloring ink extruded by the plurality of heads for coloring and the transparent clear ink extruded by the clear ink head, and wherein the flattening roller is arranged forward of the clear ink head in the moving direction of the head in the main scanning operation.

2. The forming apparatus according to claim 1, wherein the head further includes a fixed capacity head that is an extrusion head configured to extrude a single amount of droplets of the material.

3. The forming apparatus according to claim 2,
wherein the forming apparatus is configured to form the object including an inner region on an inner side of the object, and the colored region on an outer side of the inner region,
wherein the head further includes a head for forming the inner region that is an extrusion head configured to extrude the material for use in formation of the inner region, and
wherein the head for forming the inner region is the fixed capacity head.

4. The forming apparatus according to claim 1,
wherein the colored region is a region formed of the coloring ink and the clear ink,
wherein the controller is configured to cause the heads for coloring to change the amount of ink droplets the heads extrude on positions depending on colors to be provided to the respective positions on the colored region, and
wherein the controller is configured to set the amount of the clear ink extruded by the clear ink head on the positions depending on the total amount of ink extruded by the plurality of heads for coloring on the respective positions.

5. The forming apparatus according to claim 4,
wherein the clear ink head is an extrusion head configured to extrude the clear ink in multi-step variable amounts of droplets, and
wherein the controller is further configured to set the amount of droplets of the clear ink extruded by the clear ink head on the positions based on the amount of ink droplets extruded by the heads for coloring on the respective positions.

6. The forming apparatus according to claim 4, wherein the clear ink head is an extrusion head configured to extrude a single amount of droplets of the material.

7. The forming apparatus according to claim 1, wherein the controller is configured to cause the head for coloring to color at least part of the colored region in such a manner that the color of an inner part of the object in a normal direction perpendicular to the outer surface of the object is darker than the color of an outer part of the object.

8. The forming apparatus according to claim 7, wherein the controller is configured to cause the plurality of heads for coloring to color at least part of the colored region in such a manner that the color of the object becomes darker toward an inner side.

9. The forming apparatus according to claim 7,
wherein the head for coloring is configured to extrude the material in the multi-step variable amounts of droplets and to form a plurality of types of dots having different sizes as dots formed after the material hits a surface, and
wherein where a ratio of smallest size dots among the plurality of types of dots to the dots formed by the head for coloring is defined as a small dot ratio, the controller is configured to cause the head for coloring to form the dots in such a manner that the small dot ratio in the inner part of at least part of the colored region in the normal direction is smaller than the small dot ratio in the outer part.

10. The forming apparatus according to claim 9, wherein an average diameter of the dots formed on respective positions of at least part of the colored region in the normal direction is calculated, and a smaller average diameter of the dots is set for a second position that is on the outer part of a first position in the normal direction than the average diameter of the dots for the first position in the normal direction.

11. A forming apparatus configured to form a three-dimensional object, the forming apparatus comprising:
a head configured to extrude build materials;
a flattening roller configured to flatten an upper surface of layers of the materials while the materials are deposited; and
a controller configured to control extrusion of the materials by the head,
wherein the three-dimensional object includes a colored region that is colored using a coloring material among the materials,
wherein the head includes a head for coloring that is an extrusion head configured to extrude the coloring material, and a clear ink head that is an extrusion head configured to extrude a transparent material,
wherein the controller is configured to cause the head for coloring to color at least part of the colored region in such a manner that the color of an inner part of the object in a normal direction perpendicular to the outer surface of the object is darker than the color of an outer part of the object,
wherein the coloring material is coloring ink and the transparent material is clear ink,
wherein the controller is configured to control the head to perform a main scanning operation in which the head is moved in a main scanning direction orthogonal to a deposition direction in which the materials are deposited, while controlling the head to extrude the coloring ink and the clear ink,
wherein the head for coloring is arranged behind the clear ink head in a moving direction of the head in the main scanning operation, wherein the head for coloring and the clear ink head are configured to extrude the material in multi-step variable amounts of droplets, wherein the controller is configured to control the amount of droplets of the coloring ink extruded by the head for coloring and the clear ink extruded by the clear ink head, and wherein the flattening roller is arranged forward of the clear ink head in the moving direction of the head in the main scanning operation.

12. The forming apparatus according to claim 2, wherein the colored region is a region formed of the coloring ink and the clear ink, wherein the controller is configured to cause the heads for coloring to change the amount of ink droplets the heads extrude on positions depending on colors to be provided to the respective positions on the colored region, and wherein the controller is configured to set the amount of the clear ink extruded by the clear ink head on the positions depending on the total amount of ink extruded by the plurality of heads for coloring on the respective positions.

13. The forming apparatus according to claim 3, wherein the colored region is a region formed of the coloring ink and the clear ink, wherein the controller is configured to cause the heads for coloring to change the amount of ink droplets the heads extrude on positions depending on colors to be provided to the respective positions on the colored region, and wherein the controller is configured to set the amount of the clear ink extruded by the clear ink head on the positions depending on the total amount of ink extruded by the plurality of heads for coloring on the respective positions.

14. The forming apparatus according to claim 12, wherein the clear ink head is an extrusion head configured to extrude the clear ink in multi-step variable amounts of droplets, and wherein the controller is further configured to set the amount of droplets of the clear ink extruded by the clear ink head on the positions based on the amount of ink droplets extruded by the heads for coloring on the respective positions.

15. The forming apparatus according to claim 13, wherein the clear ink head is an extrusion head configured to extrude the clear ink in multi-step variable amounts of droplets, and wherein the controller is further configured to set the amount of droplets of the clear ink extruded by the clear ink head on the positions based on the amount of ink droplets extruded by the heads for coloring on the respective positions.

16. The forming apparatus according to claim 2, wherein the controller is configured to cause the head for coloring to color at least part of the colored region in such a manner that the color of an inner part of the object in a normal direction perpendicular to the outer surface of the object is darker than the color of an outer part of the object.

17. The forming apparatus according to claim 1, wherein the coloring ink and the clear ink are ultraviolet curable inks, and wherein the head further includes a UV light source for causing the ultraviolet curable inks to cure, and the UV light source is arranged behind the flattening roller in the moving direction of the head in the main scanning operation.

18. The forming apparatus according to claim 1, wherein the colored region is a region formed of the coloring ink and the clear ink, wherein the amount of ink droplets is the amount of ink droplets extruded in one extrusion operation by each of the plurality of heads for coloring and the clear ink head, wherein the controller is configured to cause the heads for coloring to change the amount of ink droplets the heads extrude on positions depending on colors to be provided to the respective positions on the colored region, and wherein the controller is configured to set the amount of the clear ink extruded by the clear ink head on the positions depending on the total amount of coloring ink extruded by the plurality of heads for coloring on the respective positions such that the clear ink compensates for a change in the total amount of coloring ink and a total amount of the clear ink and the coloring ink is uniform on each of the positions on the colored region.

* * * * *